(12) United States Patent
Foley

(10) Patent No.: US 11,589,697 B2
(45) Date of Patent: Feb. 28, 2023

(54) SERVING TRAY APPARATUS AND METHOD OF USING SAME

(71) Applicant: FOLEY ENGINEERING, LLC, Lafayette, LA (US)

(72) Inventor: Larry E. Foley, Lafayette, LA (US)

( * ) Notice: Subject to any disclaimer, the term of this patent is extended or adjusted under 35 U.S.C. 154(b) by 0 days.

(21) Appl. No.: 17/216,930

(22) Filed: Mar. 30, 2021

(65) Prior Publication Data

US 2021/0298503 A1    Sep. 30, 2021

Related U.S. Application Data

(60) Provisional application No. 63/002,444, filed on Mar. 31, 2020.

(51) Int. Cl.
| | | |
|---|---|---|
| *A47G 23/00* | (2006.01) | |
| *A47G 23/06* | (2006.01) | |
| *A47G 19/00* | (2006.01) | |
| *B65D 21/02* | (2006.01) | |
| *A23L 17/40* | (2016.01) | |
| *B65D 1/34* | (2006.01) | |
| *A47G 19/02* | (2006.01) | |
| *B65D 6/24* | (2006.01) | |
| *A47G 19/04* | (2006.01) | |
| *B65D 5/00* | (2006.01) | |

(52) U.S. Cl.
CPC ............ *A47G 23/06* (2013.01); *A23L 17/40* (2016.08); *B65D 1/34* (2013.01); *B65D 21/0215* (2013.01); *A23V 2002/00* (2013.01); *A47G 19/02* (2013.01); *A47G 19/04* (2013.01); *A47G 2019/005* (2013.01); *B65D 5/001* (2013.01); *B65D 11/188* (2013.01); *B65D 21/0209* (2013.01); *B65D 21/0234* (2013.01)

(58) Field of Classification Search
CPC . A23L 17/40; A23V 2002/00; A47B 87/0276; A47B 87/0253; A47B 87/0261; A47B 87/0269; A47B 87/0294; A47B 87/0292; A47G 19/02; A47G 19/04; A47G 19/23; A47G 19/30; A47G 2019/005; A47G 23/06; B65D 1/34; B65D 5/001; B65D 11/188; B65D 21/0215; B65D 21/048; B65D 21/0234; B65D 21/0235; B65D 21/0212; B65D 21/021; B65D 21/0213; B65D 21/0209; B65D 25/005
USPC .................. 99/646 C; 108/26, 91; 206/501, 206/503–520; 211/126.1, 126.7, 188, 211/194; 220/574.1, 4.36, 23.86; 229/178, 919, 918; 297/3
See application file for complete search history.

(56) References Cited

U.S. PATENT DOCUMENTS

| | | | | |
|---|---|---|---|---|
| 766,427 | A | * | 8/1904 | Crowell ................ A47G 19/02 220/575 |
| 2,487,168 | A | * | 11/1949 | Mordkin ............ B65D 21/0234 206/509 |
| 2,684,766 | A | * | 7/1954 | Blom ................... B65D 21/048 206/499 |

(Continued)

*Primary Examiner* — Gideon R Weinerth
(74) *Attorney, Agent, or Firm* — Ted M. Anthony; Sarah B. Dupont

(57) ABSTRACT

A stackable serving container apparatus for use with shellfish, or any other type of similar food. More particularly, a stackable serving tray apparatus that allows for ease and functionality with respect to serving cooked shellfish that is ready to be eaten and needs to be kept warm, and simultaneously provides an area for any removed shells to be discarded.

2 Claims, 5 Drawing Sheets

(56) References Cited

U.S. PATENT DOCUMENTS

| | | | | |
|---|---|---|---|---|
| 2,999,611 A * | 9/1961 | Paulson | B65D 43/021 | 220/4.24 |
| 3,014,616 A * | 12/1961 | Kavanaugh | A47G 19/26 | 206/0.8 |
| 3,018,003 A * | 1/1962 | Lockwood | B65D 21/04 | 206/505 |
| 3,236,371 A * | 2/1966 | Regis, Jr. | B42F 17/08 | 206/561 |
| 3,685,687 A * | 8/1972 | Eckdahl | A47G 23/06 | D7/553.3 |
| 3,750,892 A * | 8/1973 | Grosse | A47B 87/0269 | 206/509 |
| 3,952,903 A * | 4/1976 | Sanders | B65D 11/188 | 206/505 |
| 4,037,750 A * | 7/1977 | Box | B65D 11/188 | 206/505 |
| 4,176,747 A * | 12/1979 | Aho | B65D 11/20 | 220/675 |
| 4,181,352 A * | 1/1980 | Bumpus | A47D 11/002 | 297/3 |
| 4,244,509 A * | 1/1981 | Dlugopolski | B65D 5/22 | 229/164 |
| 4,293,071 A * | 10/1981 | Bridges | A47G 19/23 | 211/188 |
| D267,414 S * | 12/1982 | Tyke | D19/99 | |
| D275,771 S * | 10/1984 | Evans | D18/49 | |
| 4,653,737 A * | 3/1987 | Haskins | A47J 47/005 | 269/302.1 |
| 4,768,655 A * | 9/1988 | MacGregor | B42F 7/12 | 211/11 |
| 4,823,955 A * | 4/1989 | Apps | B65F 1/0053 | 206/505 |
| 4,844,264 A * | 7/1989 | Deskiewicz, Jr. | A47F 3/14 | D18/49 |
| D309,918 S * | 8/1990 | Evenson | B42F 7/12 | D19/86 |
| D310,108 S * | 8/1990 | Rittenhouse | B42F 7/12 | D19/86 |
| D327,998 S * | 7/1992 | Williams | D6/406.6 | |
| 5,318,182 A * | 6/1994 | Thorud | B65D 1/34 | 206/509 |
| D354,516 S * | 1/1995 | Crist | D19/78 | |
| 5,390,807 A * | 2/1995 | Galaburda | B65D 11/188 | 220/4.24 |
| 5,577,620 A * | 11/1996 | Jacob | G11B 23/0236 | 312/9.9 |
| D384,996 S * | 10/1997 | Munir | D21/491 | |
| D392,474 S * | 3/1998 | Frasketi | D19/91 | |
| 5,869,120 A * | 2/1999 | Blazevich | A47G 19/02 | 426/115 |
| 6,012,582 A * | 1/2000 | Haygeman | B65D 5/001 | 312/107 |
| 6,189,705 B1 * | 2/2001 | Saylor | B42F 7/12 | 211/11 |
| 7,428,864 B2 * | 9/2008 | Wengrovsky | A47G 19/04 | 108/26 |
| 8,490,823 B2 * | 7/2013 | Sirota | A47G 19/02 | 220/636 |
| 9,204,743 B2 * | 12/2015 | Sirota | A47G 19/02 | |
| D778,105 S * | 2/2017 | Coffey, Jr. | B42F 17/08 | D7/552.2 |
| 9,565,974 B2 * | 2/2017 | Nordstrom | A47J 47/005 | |
| D842,631 S * | 3/2019 | Radford | B65D 43/021 | D6/675.4 |
| 10,889,406 B2 * | 1/2021 | Oskarsson | B65D 81/3823 | |
| 2004/0238396 A1 * | 12/2004 | Slingerland | B65D 85/505 | 206/503 |
| 2005/0016940 A1 * | 1/2005 | Eby | B42F 7/12 | 211/11 |
| 2014/0069934 A1 * | 3/2014 | Wye | A47G 19/02 | 220/575 |
| 2014/0231299 A1 * | 8/2014 | Hassell | B65D 1/34 | 206/509 |
| 2016/0101895 A1 * | 4/2016 | Clark | A47B 87/0269 | 206/509 |
| 2016/0145002 A1 * | 5/2016 | Hsu | B65D 21/0212 | 206/518 |
| 2016/0176570 A1 * | 6/2016 | Collier | B65D 5/64 | 206/774 |
| 2017/0166353 A1 * | 6/2017 | Chen | B65D 21/0213 | |
| 2017/0191251 A1 * | 7/2017 | Trude | B65D 88/025 | |
| 2019/0008275 A1 * | 1/2019 | Sosna | A47B 87/0253 | |
| 2019/0225364 A1 * | 7/2019 | Wang | B65D 5/003 | |
| 2020/0307874 A1 * | 10/2020 | Lazarus | B65D 51/24 | |

* cited by examiner

SERVING TRAY APPARATUS AND METHOD OF USING SAME

BACKGROUND OF THE INVENTION

Field of the Invention

The present invention pertains to a serving container apparatus for use with shellfish, or any other type of similar food. More particularly, the present invention pertains to a stackable serving tray apparatus that allows for ease and functionality with respect to serving cooked shellfish that is ready to be eaten and needs to be kept warm, and simultaneously provides an area for any removed shells to be discarded.

Brief Description of the Prior Art

Traditional shellfish serving trays are typically comprised of a substantially planar and circular shaped container having a raised border or edging in order to maintain any cooked shellfish within the container. However, traditional shellfish trays are typically used in a pair, wherein one tray is used for cooked shellfish and a second tray is used to discard the shellfish shells. As such, this traditional method can cause an overflow of serving trays on a dining table, and thus leave little to no extra space. Additionally, said tradition shellfish serving trays comprise open trays, wherein any uneaten and cooked shellfish will lose heat due to convection.

SUMMARY OF THE INVENTION

The present invention comprises a serving tray apparatus further comprising a substantially rectangular shaped container (or any other similarly shaped container that allows for a plurality of trays to fit properly on a single table), having a base and a plurality of sides. Said base is substantially slanted, wherein a front end of said base slants downward toward said front end, and a back end of said base is raised towards said back. Said base and said sides cooperate to form an inner reservoir, wherein said reservoir is used for holding a particular food item, such as, for example, any type of shellfish. Said sides are oriented in a perpendicular configuration relative to each other, wherein said sides connect to each other thereby forming a plurality of corners. Said corners on a first side of said tray apparatus are raised at an upper end of said corners, wherein said corners on a second side of said tray apparatus are recessed at an upper end of said corners. Moreover, a front end of said tray apparatus comprises a recess in order to allow a user access to said cooked shellfish that is to be kept within said inner reservoir.

Said serving tray apparatus of the present invention is generally used in a pair, wherein a first serving tray apparatus and a second serving tray apparatus are able to be used in a stackable configuration. Said trays are stacked by way of inverting a second tray over a first tray. The corners of said trays interlock with each other in order to secure said second tray in place on top of said first tray.

In a preferred embodiment, when in operation, the cooked shellfish is served in a first serving tray located on a bottom surface. A second serving tray is then placed on top of said first serving tray in an inverted position, thereby providing a void wherein a user is able to place his or her hands within said serving tray apparatus in order to remove said cooked shellfish from within said inner reservoir. The sides of the trays and the inverted top tray cooperate in order to retain the heat of any uneaten shellfish within the device. Said bottom tray is slanted towards said front end in order for said cooked and uneaten shellfish to slide towards said front end. Said recess located on said front end of said tray allows for a user to access said uneaten cooked shellfish; thus, when said top tray is inverted onto said bottom tray, the area of said recess is doubled in size, thereby allowing for easier access to said uneaten and cooked shellfish. Additionally, said inverted top tray provides an area for removed and discarded shells to be placed after said shells have been peeled and removed from said cooked shellfish. As a result, said tray also provides for easy clean up and throw away of said used and discarded shells.

Said serving tray apparatus of the present invention reduces the required table area that is needed in comparison to having both a separate tray for uneaten shellfish and a separate tray for the used and discarded shells. Moreover, said stackable serving trays are low enough in height in order to allow for continued eye contact with people on an opposite side of a table from said user (compared to any columnar design).

BRIEF DESCRIPTION OF THE DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

The present invention comprises a serving tray apparatus 100, wherein said serving tray apparatus 100 comprises a substantially rectangular shaped container (or any other similarly shaped container that allows for a plurality of trays to fit properly on a single table) for use in holding and serving a particular food item, such as, for example, crawfish, shrimp, or any other type of shellfish. The serving tray apparatus 100 of the present invention can be manufactured from a substantially rigid material, such as a plastic material, or any other material exhibiting like characteristics, that can be easily stored and cleaned.

Figure 1:
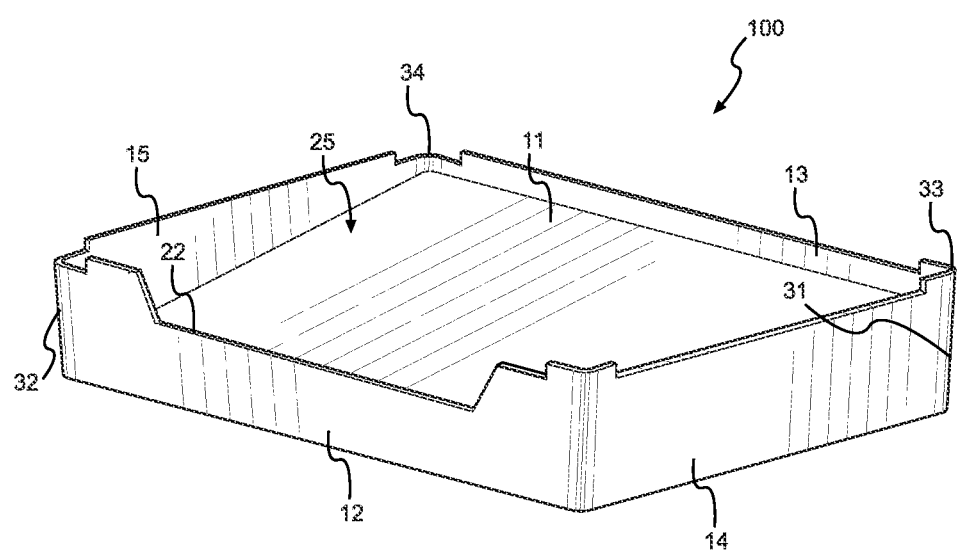
FIG. 1 depicts a perspective view of a preferred embodiment of a serving tray apparatus of the present invention.

Referring to the drawings, FIG. 1 depicts a perspective view of serving tray apparatus 100 of the present invention, generally comprising a base 11, a front end 12, a rear end 13, a first side 14, and a second side 15. Said base 11 is oriented in a substantially slanted configuration, wherein a front end of said base 11 slants relatively downward toward said front end 12 of said serving tray apparatus 100, and a back end of said base 11 is relatively raised towards said rear end 13 of said serving tray apparatus 100. Said base 11, said front end 12, said rear end 13, said first side 14, and said second side 15 all cooperate to form an inner reservoir 25, wherein said reservoir 25 is used for holding a particular food item, such as, for example, any type of shellfish. Said first side 14 and said second side 15 are oriented in a perpendicular configuration relative to each other, wherein said first side 14 and said second side 15 each connect to said front end 12 and said rear end 13, thereby forming a plurality of corners.

Said plurality of corners comprise a set of first side corners 31 and a set of side second corners 32, wherein said first side corners 31 are located on said first side 14 of said tray apparatus 100, and said second side corners 32 are located on said second side 15 of said tray apparatus 100. Said first side corners 31 are raised relative to a top end surface of said first side 14, thus comprising a raised extension member 33, and said second side corners 32 are recessed relative to a top end surface of said second side 15, thus comprising a recessed notch 34.

Still referring to FIG. 1, said front end 12 of said serving tray apparatus 100 comprises a recessed opening 22, wherein said recessed opening 22 allows a user to be able to reach his or her hand into said recessed opening 22, and thus, into said inner reservoir 26, in order to access cooked shellfish.

Figure 2:
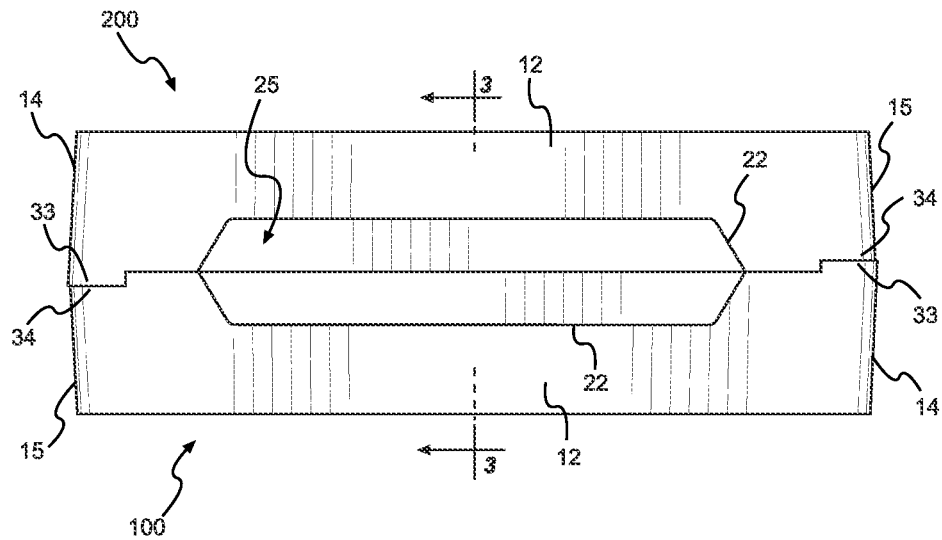
FIG. 2 depicts a front view of a preferred embodiment of a serving tray apparatus of the present invention in a stackable configuration for use with a second serving tray apparatus.
Figure 3:
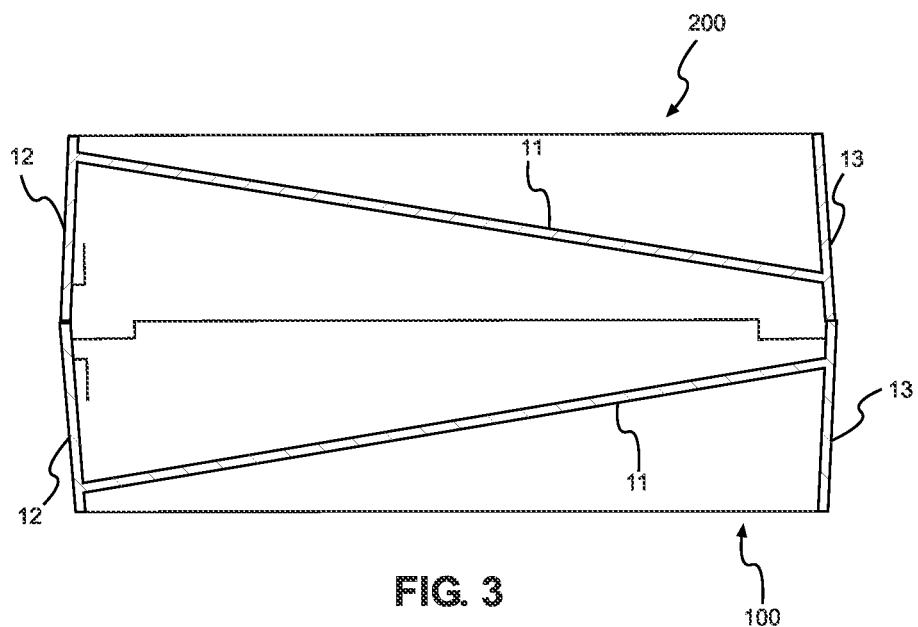
FIG. 3 depicts a side view of a preferred embodiment of a serving tray apparatus of the present invention in a stackable configuration for use with a second serving tray apparatus.

FIG. 2 depicts a front end view of said serving tray apparatus 100 of the present invention in a stackable configuration with an additional serving tray apparatus 100. FIG. 3 depicts a side view of said first serving tray apparatus 100 of the present invention in a stackable configuration with said second serving tray apparatus 200, wherein first serving tray 100 and second serving tray 200 are stacked in a configuration for use in serving cooked shellfish. In a preferred embodiment, said serving tray apparatus 100 is used in conjunction with an additional serving tray apparatus 200, wherein a second serving tray apparatus 200 is inverted and stacked on top of a first serving tray apparatus 100. For purposes of the discussion herein, said second serving tray apparatus is to be labeled as "200" for ease in identification; however, it is to be noted that said first serving tray apparatus 100 and said second serving tray apparatus 200 have the exact same configuration as each other.

In a preferred embodiment, as illustrated in FIGS. 2 and 3, said first serving tray 100 and said second serving tray 200 are stacked by way of inverting said second tray 200 over and on top of said first tray 100. First side corners 31 of second serving tray 200 align and interlock with second side corners 32 of first serving tray 100; second side corners 32 of second serving tray 200 align and interlock with first side corners 31 of first serving tray 100. Thus, said raised extension 33 from said first side corners 31 connect and join with said recessed notch 34 from said second side corners 32. As such, said first side corners 31 and said second side corners 32 of said first tray 100 and said second tray 200 interlock with each other in order to secure said second tray 200 in place on top of said first tray 100.

Additionally, said recess 22 on said front end 12 of said second serving tray 200 aligns with said recess 22 on said front end 12 of said first serving tray 100, thereby creating a substantially larger opening for a user to reach his or her hand through said recess 12, and thus, into said inner reservoir 25 in order to obtain a piece of cooked shellfish 5.

Moreover, as depicted in FIG. 3, when second tray apparatus 200 is stacked in a configuration on top of said first tray apparatus 100 for use in holding and serving cooked shellfish, base 11 of serving tray 200 is not parallel to base 11 of serving tray 100, and thus a slant of said base 11 of said second serving tray allows for a substantially larger inner reservoir 25 in order to hold cooked shellfish 5, while allowing for any discarded shells 6 to be placed within an outer reservoir 26.

Figure 4:
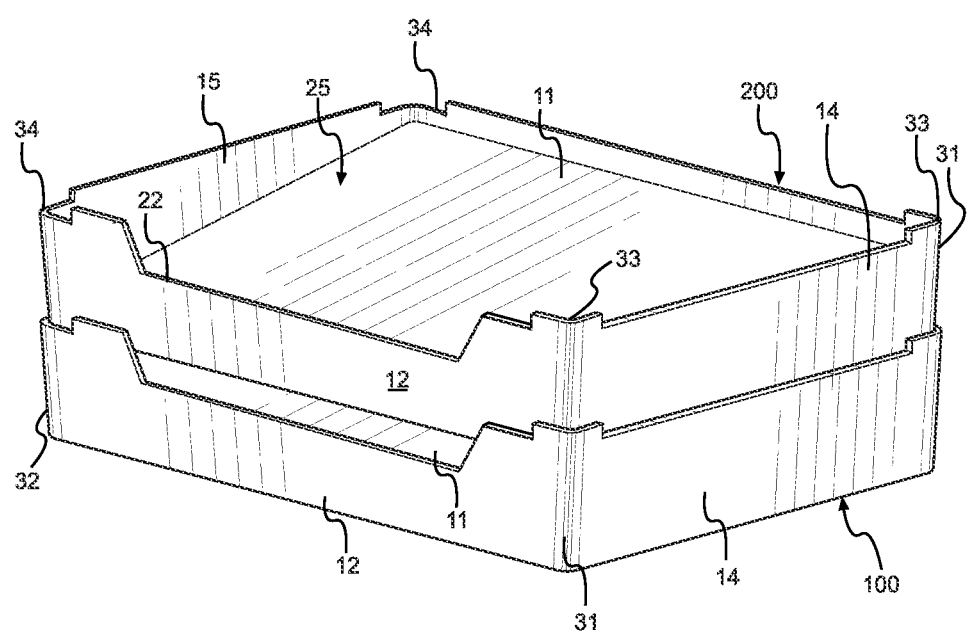
FIG. 4 depicts a perspective view of a preferred embodiment of a serving tray apparatus of the present invention in a stackable configuration for storage with a second serving tray apparatus.

FIG. 4 depicts a perspective view of first serving tray apparatus 100 of the present invention in a stackable configuration with second serving tray apparatus 200, wherein first serving tray 100 and second serving tray 200 are stacked in a configuration for use in storage purposes. Serving tray 100 comprises base 11, front end 12, rear end 13, first side 14, and second side 15. Said base 11 is oriented in a substantially slanted configuration, wherein a front end of said base 11 slants relatively downward toward said front end 12 of said serving tray apparatus 100, and a back end of said base 11 is relatively raised towards said rear end 13 of said serving tray apparatus 100. Said base 11, said front end 12, said rear end 13, said first side 14, and said second side 15 all cooperate to form inner reservoir 25, wherein said reservoir 25 is used for holding a particular food item, such as, for example, any type of shellfish. Said first side 14 and said second side 15 are oriented in a perpendicular configuration relative to each other, wherein said first side 14 and said second side 15 each connect to said front end 12 and said rear end 13, thereby forming a plurality of corners.

Said plurality of corners comprise first side corners 31 and second side corners 32, wherein said first side corners 31 are located on said first side 14 of said tray apparatus 100, and said second side corners 32 are located on said second side 15 of said tray apparatus 100. Said first side corners 31 are raised relative to a top end surface of said first side 14, thus comprising a raised extension member 33, and said second side corners 32 are recessed relative to a top end surface of said second side 15, thus comprising a recessed notch 34.

When serving tray 100 is in a stackable configuration with serving tray 200 for use in storage purposes, serving tray 200 is placed directly on top of serving tray 100 in a proper aligned configuration. As such, first side 14 of serving tray 200 aligns correctly with first side 14 of serving tray 100, and second side 15 of serving tray 200 aligns correctly with second side 15 of serving tray 100. Thus, when serving tray 100 and serving tray 200 are disposed in this stackable configuration for storage, said base 11 of serving tray 200 is parallel with said base 11 of serving tray 100. This configuration allows for a more compact design in order to maintain easier and more efficient storage of serving tray apparatus 100 of the present invention.

Figure 5:
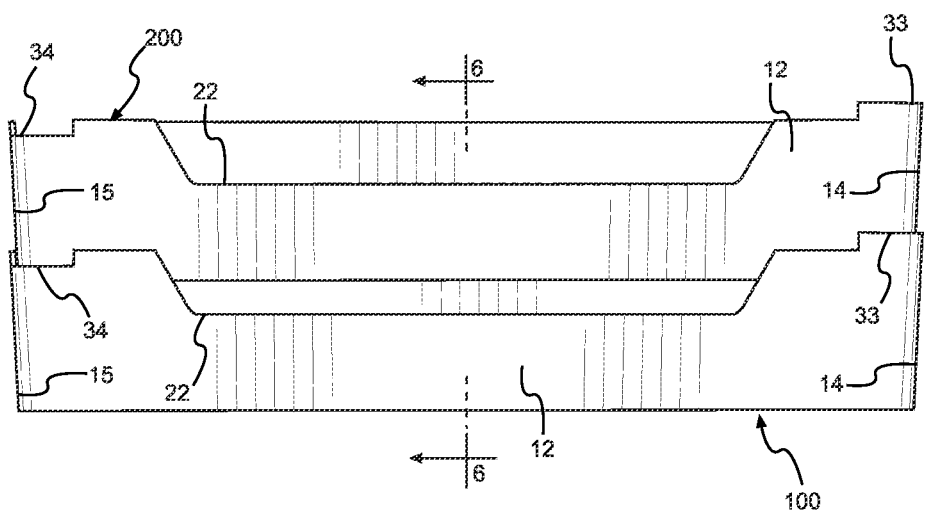
FIG. 5 depicts a front view of a preferred embodiment of a serving tray apparatus of the present invention in a stackable configuration for storage with a second serving tray apparatus.
Figure 6:
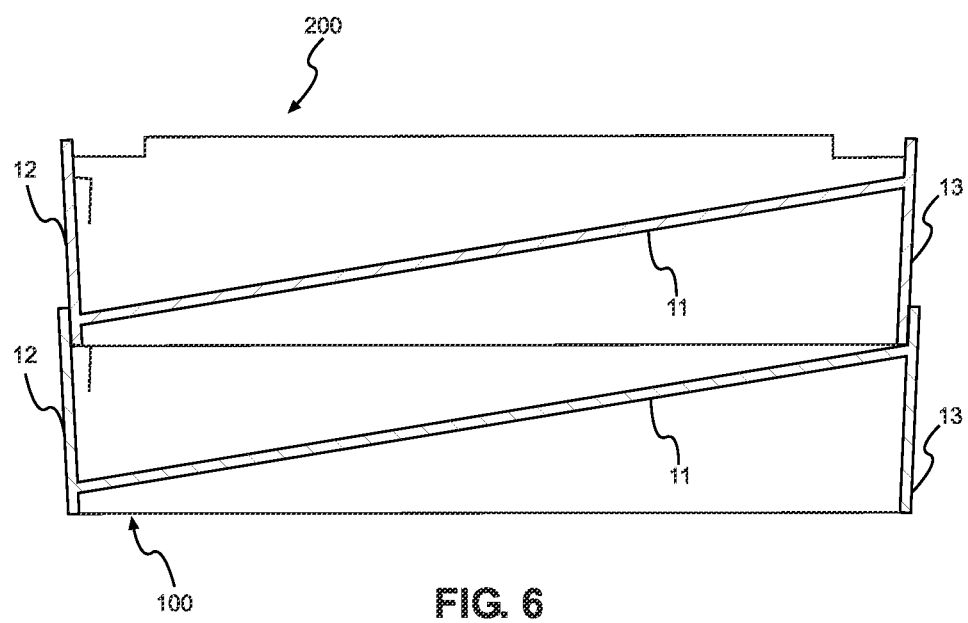
FIG. 6 depicts a side view of a preferred embodiment of a serving tray apparatus of the present invention in a stackable configuration for storage with a second serving tray apparatus.

FIG. 5 depicts a front end view of first serving tray apparatus 100 of the present invention in a stackable configuration with second serving tray apparatus 200, wherein first serving tray 100 and second serving tray 200 are stacked in a configuration for use in storage purposes. FIG. 6 depicts a side view of first serving tray apparatus 100 of the present invention in a stackable configuration with second serving tray apparatus 200, wherein first serving tray 100 and second serving tray 200 are stacked in a configuration for use in storage purposes.

Figure 7:
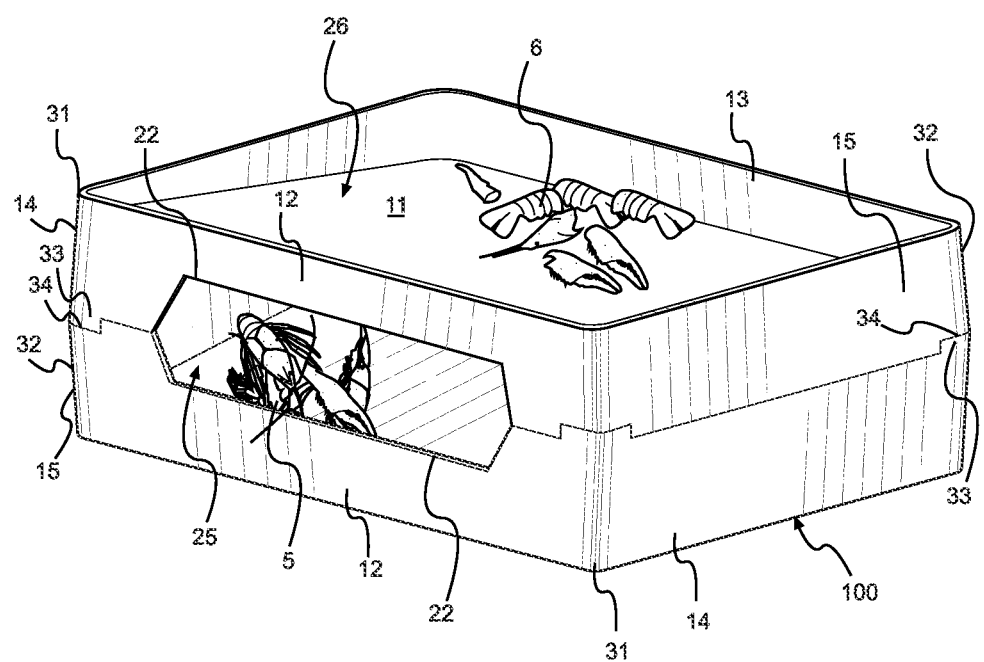
FIG. 7 depicts a perspective view of a preferred embodiment of a serving tray apparatus of the present invention in a stackable configuration for use with a second serving tray apparatus.

FIG. 7 depicts a perspective view of said first serving tray apparatus 100 of the present invention in a stackable configuration with said second serving tray apparatus 200, wherein first serving tray 100 and second serving tray 200 are stacked in a configuration for use in serving cooked shellfish. Serving tray apparatus 100 of the present invention generally comprises base 11, front end 12, rear end 13, first side 14, and second side 15. Said base 11 is oriented in a substantially slanted configuration, wherein a front end of said base 11 slants relatively downward toward said front end 12 of said serving tray apparatus 100, and a back end of said base 11 is relatively raised towards said rear end 13 of said serving tray apparatus 100. Said base 11, said front end 12, said rear end 13, said first side 14, and said second side 15 all cooperate to form inner reservoir 25, wherein said reservoir 25 is used for holding a particular food item, such as, for example, any type of shellfish. Said first side 14 and said second side 15 are oriented in a perpendicular configuration relative to each other, wherein said first side 14 and said second side 15 each connect to said front end 12 and said rear end 13, thereby forming a plurality of corners.

Said plurality of corners comprise first side corners 31 and second side corners 32, wherein said first side corners 31 are located on said first side 14 of said tray apparatus 100, and said second side corners 32 are located on said second side 15 of said tray apparatus 100. Said first side corners 31 are raised relative to a top end surface of said first side 14, thus comprising raised extension member 33, and said second side corners 32 are recessed relative to a top end surface of said second side 15, thus comprising recessed notch 34.

Still referring to FIG. 7, said front end 12 of said serving tray apparatus 100 comprises recessed opening 22, wherein said recessed opening 22 allows a user to be able to reach his or her hand into said recessed opening 22, and thus, into said inner reservoir 26, in order to access cooked shellfish.

In a preferred embodiment, said serving tray apparatus 100 is used in conjunction with an additional serving tray apparatus 200, wherein second serving tray apparatus 200 is inverted and stacked on top of first serving tray apparatus 100. For purposes of the discussion herein, said second serving tray apparatus is to be labeled as "200" for ease in identification; however, it is to be noted that said first serving tray apparatus 100 and said second serving tray apparatus 200 have the exact same configuration as each other.

In a preferred embodiment, as illustrated in FIG. 7, said first serving tray 100 and said second serving tray 200 are stacked by way of inverting said second tray 200 over and on top of said first tray 100. First side corners 31 of second serving tray 200 align and interlock with second side corners 32 of first serving tray 100; second side corners 32 of second serving tray 200 align and interlock with first side corners 31 of first serving tray 100. Thus, said raised extension 33 from said first side corners 31 connect and join with said recessed notch 34 from said second side corners 32. As such, said first side corners 31 and said second side corners 32 of said first tray 100 and said second tray 200 interlock with each other in order to secure said second tray 200 in place on top of said first tray 100.

Additionally, said recess 22 on said front end 12 of said second serving tray 200 aligns with said recess 22 on said front end 12 of said first serving tray 100, thereby creating a substantially larger opening for a user to reach his or her hand through said recess 12, and thus, into said inner reservoir 25 in order to obtain a piece of cooked shellfish.

Moreover, as further depicted in FIG. 7, when second tray apparatus 200 is stacked in a configuration on top of said first tray apparatus 100 for use in holding and serving cooked shellfish, base 11 of serving tray 200 is not parallel to base 11 of serving tray 100, and thus a slant of said base 11 of said second serving tray allows for a substantially larger inner reservoir 25 in order to hold cooked shellfish 5, while allowing for any discarded shells to be placed within an outer reservoir 26.

In a preferred embodiment, when in operation, the cooked shellfish 5 is served in first serving tray 100 located on a bottom surface. Second serving tray 200 is then placed on top of said first serving tray 100 in an inverted position, thereby providing a substantially larger void with recess 22 from first serving tray 100 combining with recess 22 from second serving tray apparatus, wherein a user is able to place his or her hands within said serving tray apparatus 100 in order to remove said cooked shellfish 5. First sides 14 and second sides 15 of the trays 100, 200 and the inverted top tray 200 cooperate in order to retain the heat of any uneaten shellfish 5 located within the inner reservoir 25 of serving tray apparatus 100. Said bottom tray 100 comprises base 11 that is slanted downward towards said front end 12 in order for said cooked and uneaten shellfish 5 to slide towards said front end 12.

Said recess 22 located on said front end 12 of said tray 100, 200 allows for a user to access said uneaten shellfish 5; thus, when said top tray 200 is inverted onto said bottom tray 100, the area of said recess 22 is doubled in size, thereby allowing for easier access to said uneaten shellfish 5. Additionally, said inverted top tray provides an outer reservoir area 26 for removed and discarded shells 6 to be placed after said shells have been peeled and removed from said cooked shellfish.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A stackable serving tray apparatus comprising a substantially rectangular container member having a base, a front end, a back end, a first side, and a second side wherein:
   a) said base, said front end, said back end, said first side, and said second side cooperate to form an inner reservoir;
   b) said front end, said back end, said first side, and said second side cooperate and connect to each other to form a plurality of corners;
   c) said base is disposed in a substantially slanted orientation;
   d) said front end of said container member comprises a notched opening; and
   e) wherein said corners of said first side of said container member are in a raised position relative to an upper end of said container, and said corners of said second side of said container are in a recessed position relative to an upper end of said container member.

2. The apparatus of claim 1, wherein a second serving tray apparatus is inverted and stacked on a first serving tray apparatus, and said corners of each said first serving tray apparatus and said second serving tray apparatus interlock with each other.

\* \* \* \* \*